March 31, 1931.   E. D. HARRINGTON   1,799,097
ELECTRICAL CONTROL SYSTEM
Filed Nov. 1, 1928
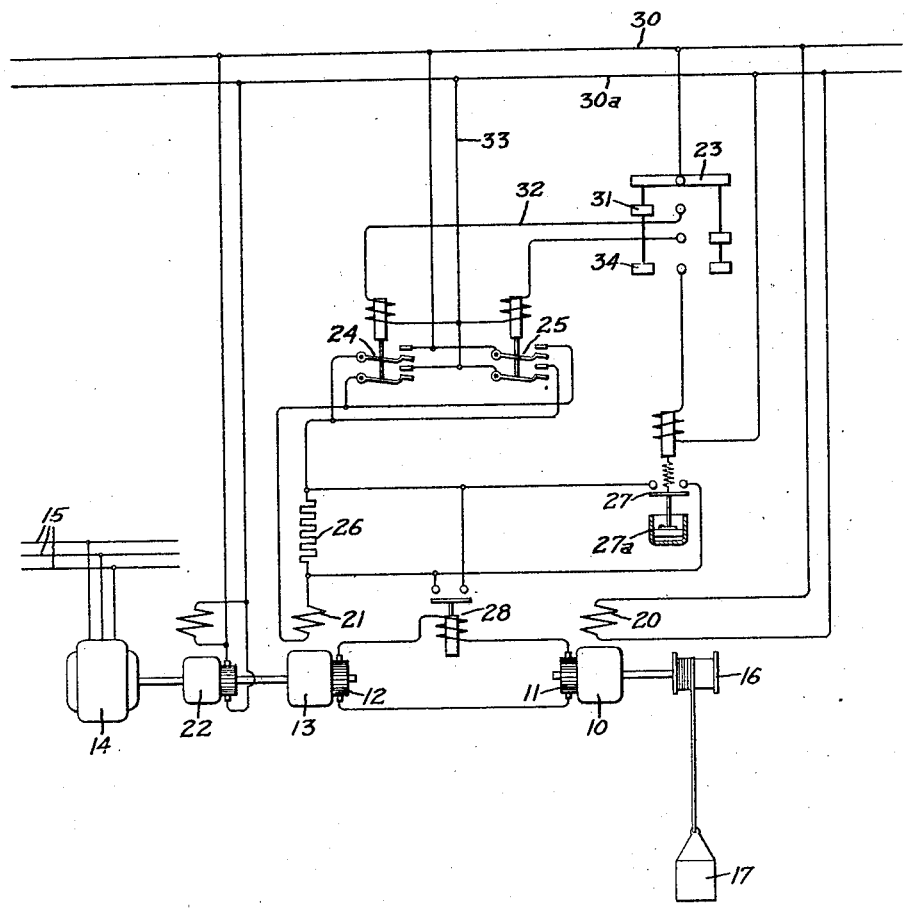
Inventor:
Elliott D. Harrington,
by Charles E. Tullar
His Attorney.

Patented Mar. 31, 1931

1,799,097

UNITED STATES PATENT OFFICE

ELLIOTT D. HARRINGTON, OF SCHENECTADY, NEW YORK, ASSIGNOR TO GENERAL ELECTRIC COMPANY, A CORPORATION OF NEW YORK

ELECTRICAL CONTROL SYSTEM

Application filed November 1, 1928. Serial No. 316,569.

My invention relates to electrical control systems for dynamo-electric machines and more particularly to control systems for electric machines operating in what is known as the Ward-Leonard system, in which a separately excited generator has its armature connected in a local circuit with the armature of a separately excited motor, and has for its object the provision of such a control system which in a simple and efficient manner provides improved operating characteristics.

Although it obviously has other applications, my invention is particularly useful in connection with elevators, hoists and like apparatus where frequent reversals and widely varying loads are encountered.

The Ward-Leonard system is now being successfully applied to the driving of elevators and like apparatus. One method of accelerating the operating motor in such systems from zero to full speed is to throw full voltage across the generator field and then govern the rate of acceleration by the inherent time lag of this field.

It has been found that this method of governing the rate of motor acceleration possesses certain undesirable speed characteristics, particularly in installations where widely varying loads are encountered. Thus, in elevator installations where a smooth and easy acceleration of the operating motor is essential to avoid discomfort to the passengers as well as severe strain and shock to the elevator mechanism, the following objectionable speed characteristics were encountered:

The rate of acceleration for light or overhauling loads is considerably greater than for heavy "motoring" loads. Therefore, after the accelerating rate for heavy "motoring" loads had been determined and fixed, it was found that the accelerating rate for a light load or an overhauling load was so great that serious discomfort would oftentimes be experienced by the elevator passengers. This was found to be true in particular when accelerating full overhauling loads. Thus, when accelerating a full over-hauling load there was found to be a tendency for the motor speed to increase momentarily above the normal full speed corresponding to the elevator load at the time, that is to say the motor had been caused to give appreciable "overshoot".

In one of its aspects my invention contemplates the provision of a system of electrical control whereby the operating motor of a Ward-Leonard system will accelerate loads of widely varying degrees in substantially the same interval of time.

In carrying my invention into effect in one form thereof, I provide the generator, which is utilized to supply power to the operating motor, with control means operative to increase the generator excitation after a predetermined interval of time so that the motor may be accelerated with a reduced generator field. Moreover, I cause my control means to respond to a suitable generator operating condition, as for example the current demand imposed on the generator, so that its excitation will be increased independently of the predetermined time interval in the event the motor is accelerating a load above a predetermined value.

For a more complete understanding of my invention reference should be had to the accompanying drawing in which the single figure is a diagrammatic representation of a system of control embodying my invention.

Referring to the drawing, I have shown my invention in one form as applied to a direct current motor employed to operate an elevator, the motor being electrically supplied by a generator in accordance with the Ward-Leonard system. As shown, the Ward-Leonard drive is represented conventionally, the elevator driving motor 10 having an armature 11 included in a local circuit with the armature 12 of the generator 13. The generator 13 is driven at a substantially constant speed by any suitable means. As shown, a suitable induction motor 14 provided for this purpose is directly connected to the generator 13. A suitable source of alternating current supply 15 is provided for the motor 14. The motor 10 which may be utilized to operate various sorts of apparatus is shown as directly connected to the hoisting drum 16 of an elevator car 17.

The motor 10 is provided with a separately excited field winding 20 and the generator 13 is provided with a separately excited field winding 21. A suitable self-excited exciter 22 is provided for exciting the field windings 20 and 21. The control system for the generator field winding 21 includes a manually operated master switch 23 and directional switches 24 and 25. The arrangement thus far described is the customary Ward-Leonard drive, in which the direction of operation and speed variation of the motor 10 is governed by suitable operation of the master switch 23.

In order to regulate the excitation of the generator and thus the speed of the driving motor 10 during the accelerating period so that the motor will be caused to accelerate loads of widely different values in substantially the same interval of time, I connect a suitable resistor 26 in series in the generator field circuit. It will be understood that the generator excitation and thus the speed of the operating motor will be reduced by inserting the resistor in the generator field circuit, and that the excitation and motor speed will be increased by removing the resistor from the motor circuit. Thus, when accelerating light loads or overhauling loads I insert the resistor in the field circuit so as to counteract the tendency of the motor to rapidly accelerate whereas when accelerating heavy "motoring" loads I short-circuit the resistor so as to hasten the rate of acceleration.

I place the resistor 26 under the control of suitable means which respond both to a time interval and to a suitable generator operating condition which condition will be a measure of the motor load. As shown, I connect a suitable time element switch 27 in a short-circuit connection about the resistor 26. The switch 27 is normally open and is energized so as to be operated to its closed position in response to the movement of the master controller 23 to effect an energization of the generator field winding 21. Any suitable means may be provided for retarding the closing of switch 27. As shown, a suitable dash pot 27a is provided for this purpose, the dash pot being provided with any well-known regulating means so as to adjust the interval of time in which the switch will close. It will be understood that when the switch 27 is closed, the resistor 26 will be short-circuited and full excitation voltage will be applied to the field winding 21.

In order to remove the resistor 26 from the field winding circuit during the interval of time in which the switch 27 is moving to its closed position in the event the motor load is above a predetermined value, I provide a suitable normally open relay 28 in a short-circuit connection about the resistor. This relay is provided with an operating coil connected in series in the local armature circuit. It will be understood that this relay may be set to close at any desired current value, and thus, as is well understood, may be set to close upon the occurrence of any desired motor load. Thus, should the load imposed upon the motor be greater than a certain value during the accelerating period, the relay 28 will close so as to remove the resistor 26 from the generator field winding circuit and thereby apply full excitation to the generator. As a result of this operation the rate of rise of the generator voltage will be increased so as to increase the rate at which the motor 10 will accelerate the load.

In operation, it will be understood that the generator 13 will be driven at a substantially constant speed by means of the induction motor 14. When it is desired to operate the motor 10, the master controller 23 will be moved in a direction to effect an energization of the proper directional contactor 24 or 25. Thus, it will be observed that when the master switch 23 has been moved toward the right, as viewed in the figure, to its controlling position, an energizing circuit for the operating coil of the contactor 24 will be completed from the upper conductor 30 of the excitation source through the upper finger of the controller 23, the finger 31 of the controller, the conductor 32, the operating coil of the contactor 24 and thence through the conductor 33 to the lower conductor 30a of the excitation source. The contactor 24 will then close thereby connecting the generator field winding 21 to the source of excitation in series with the resistor 26. The motor 10 will then begin to accelerate in the desired direction under the influence of a reduced generator field.

It will be observed that this movement of the controller 23 will also effect an energization of the timing switch 27. The energizing circuit for this switch may be traced from the conductor 30 through the controller finger 23, the finger 34, the operating coil of the switch 27 and thence to the conductor 30a. If the motor is accelerating a load of such a value that the armature current will be insufficient to pick up the relay 28, the motor will accelerate with reduced field for the full period as determined by the timing mechanism 27. However, should the motor be accelerating a heavy motoring load, that is a load which will cause an armature current greater than the setting of the relay 28 the relay will be closed so as to short-circuit the resistor 26 whereby full excitation voltage will be impressed upon the generator field winding. As a result of this operation the motor will tend to speed up so as to hasten the acceleration of the load. Thus, when the motor is so loaded that its rate of acceleration would be abnormally low, the generator field will be strengthened automatically so as to increase this rate of acceleration. It will be understood that should this heavy load be but momentary the relay 28 will open again so as to reinsert the resistor 26. In any event full field excitation will be applied at the end of the time interval since the switch 27 will close to shunt the resistor 26. Thus, the rate of motor acceleration will be substantially the same regardless of the load being accelerated.

It will be understood that should it be desired to reverse the direction of operation of the motor the master controller 23 will be moved toward the left, as viewed in the figure, so as to energize the contactor 25. This operation will effect a reversal in the polarity of the generator field and in consequence will effect a reversal of the motor 10. The operation of the timing switch 27 and the relay 28 in controlling the acceleration of the motor in its reversed direction will be identical with that already described.

It will be readily understood by those skilled in the art that a multi-position speed controller may be substituted for the master controller 23, the energization of the timing mechanism 27 being effected on the last point or the next to last point of the controller for either direction of operation. Although it is general practice to use a multi-position speed controller, to illustrate such a complete control system would serve merely to complicate the disclosure.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an electrical generator, of means responsive to a time interval for controlling the excitation of said generator so as to effect an increase thereof after a predetermined interval of time and means dependent upon a predetermined condition of operation of said generator for controlling the excitation of said generator so as to effect an increase thereof during said time interval.

2. The combination with an electrical generator, of means responsive to a time interval for controlling the excitation of said generator so as to effect an increase thereof after a predetermined interval of time and means responsive to the current demand imposed on said generator for controlling said excitation so as to effect an increase thereof during said time interval when said current demand is above a predetermined value.

3. The combination with an electrical generator, of means for regulating the excitation of said generator and means for controlling said regulating means comprising means responsive to a time interval operably associated with said regulating means whereby said excitation is strengthened after a predetermined interval of time and means responsive to the load imposed upon said generator operably associated with said regulating means whereby said excitation is strengthened when said load is above a predetermined value during said time interval.

4. The combination with an electrical generator having a field winding, of a resistor associated with said field winding, means responsive to a time interval for controlling said resistor whereby the field excitation is increased after a predetermined interval of time and means responsive to the current demand imposed on said generator for controlling said resistor whereby the field excitation is increased during said time interval in the event of a current demand above a predetermined value.

5. In a system of electrical control, an electric motor, an electric generator having its armature connected in a local circuit with the armature of said motor, means responsive to a time interval for controlling the excitation of said generator so as to effect an increase thereof after a predetermined interval of time and means responsive to a predetermined condition in said local circuit for controlling the excitation of said generator so as to effect an increase thereof during said interval of time.

6. A system of motor control comprising an electric motor, a generator having a field winding, said generator being connected to electrically supply said motor, a resistor connected in the generator field winding circuit, means responsive to the energization of said field winding and a time interval for controlling said resistor whereby the excitation of said generator is increased after a predetermined interval of time and means responsive to the motor load for controlling said resistor whereby the excitation of said generator is increased during said interval of time in the event the motor load rises above a predetermined value.

7. A system of motor control comprising a separately excited direct current motor, a separately excited direct current generator for supplying the armature current for said motor, a source of excitation for said motor, a resistor connected in the field winding circuit of said generator, control means arranged to connect said generator field winding with said excitation source and to control the polarity of the generator field, time interval switching mechanism for controlling said resistor, said time interval switching mechanism being energized responsively to the interconnection of said field winding with its source of excitation, whereby said field is strengthened after a predetermined interval of time and a relay responsive to the current demand of said motor for controlling said resistor whereby said generator field is strengthened during said interval of time when said current demand is above a predetermined value.

8. A system of motor control comprising a separately excited direct current motor, a separately excited direct current generator having a field winding, electrical connections between the armatures of said motor and generator, a source of excitation for said generator field winding, control means comprising a master switch arranged to connect said field winding to its source of excitation and to control the polarity of the generator field, a resistor connected in the circuit of said field winding, a circuit for shunting said resistor, a time interval switching mechanism for controlling said circuit, said time interval switching mechanism being energized responsively to the operation of said master switch so as to shunt said resistor after a predetermined interval of time, a second circuit for shunting said resistor and a relay for controlling said second circuit, said relay being responsive to the current in said armature connections so as to shunt said resistor when said current is above a predetermined value.

In witness whereof, I have hereunto set my hand this 30th day of October, 1928.

ELLIOTT D. HARRINGTON.